(12) United States Patent
Shigematsu et al.

(10) Patent No.: US 8,302,264 B2
(45) Date of Patent: Nov. 6, 2012

(54) BAND AND BAG SET

(75) Inventors: Shuji Shigematsu, Hiroshima (JP); Miho Yamanouchi, Hiroshima (JP); Aya Murakami, Hiroshima (JP)

(73) Assignee: JMS Co., Ltd., Hiroshima (JP)

( * ) Notice: Subject to any disclaimer, the term of this patent is extended or adjusted under 35 U.S.C. 154(b) by 307 days.

(21) Appl. No.: 12/680,276

(22) PCT Filed: Sep. 29, 2008

(86) PCT No.: PCT/JP2008/002711
§ 371 (c)(1),
(2), (4) Date: Mar. 26, 2010

(87) PCT Pub. No.: WO2009/041071
PCT Pub. Date: Apr. 2, 2009

(65) Prior Publication Data
US 2010/0212118 A1 Aug. 26, 2010

(30) Foreign Application Priority Data
Sep. 28, 2007 (JP) .................................. 2007-255328

(51) Int. Cl.
*B65D 63/10* (2006.01)

(52) U.S. Cl. ..................... 24/16 PB; 24/17 A; 24/30.5 P

(58) Field of Classification Search ................ 24/16 PB, 24/30.5 P, 16 R, 17 R, 17 A, 17 AP
See application file for complete search history.

(56) References Cited

U.S. PATENT DOCUMENTS

| | | | | |
|---|---|---|---|---|
| 3,086,265 A | * | 4/1963 | Orenick et al. | 24/30.5 P |
| 3,206,813 A | * | 9/1965 | Schumm | 24/16 PB |
| 3,581,347 A | * | 6/1971 | Verspieren | 24/16 PB |
| 3,731,347 A | * | 5/1973 | Caveney et al. | 24/16 PB |
| 4,141,565 A | * | 2/1979 | Shields | 280/814 |
| 5,363,536 A | * | 11/1994 | Kleeman | 24/30.5 P |
| 6,226,839 B1 | * | 5/2001 | Sayegh | 24/16 PB |
| 2007/0033772 A1 | | 2/2007 | Brownlee et al. | 24/16 PB |

FOREIGN PATENT DOCUMENTS

| | | |
|---|---|---|
| CN | 2538709 Y | 3/2003 |
| EP | 1 752 384 A2 | 2/2007 |
| EP | 2863495 A2 | 2/2007 |
| JP | 01-176436 | 12/1989 |
| JP | 09-210020 | 8/1997 |
| JP | 2003-047139 | 2/2003 |
| JP | 2007-112511 | 5/2007 |

OTHER PUBLICATIONS

European Search Report dated Sep. 1, 2011 from corresponding EP Appln. No. 08832898.4.
Inernational Search Report from PCT/JP2008/002711 dated Dec. 24, 2008.
European Search Report dated Sep. 1, 2011 from corresponding EP Application No. 08832898.4.

* cited by examiner

*Primary Examiner* — James Brittain
(74) *Attorney, Agent, or Firm* — Ohlandt, Greeley, Ruggiero & Perle, L.L.P.

(57) ABSTRACT

Teeth 31 and 32 are formed on opposite sides of a strip portion 2 of a band 1 in the width direction. Protruding portions 51-54 are formed in a proximal portion 20 of the strip portion 2 so as to respectively engage the teeth 31 and 32 on the opposite sides of the strip portion 2 in the width direction. A release portion is provided between the protruding portions 51-54 for allowing a portion of the distal portion 22 and the intermediate portion 21 of the strip portion 2 where the teeth 31 and 32 are formed to be moved into and out of a space between the protruding portions 51-54.

9 Claims, 9 Drawing Sheets

(a)

(b)

though the through hole from the distal portion thereof, a tooth is engaged to the engaging portion, and the strip portion is kept in the ring form. Thus, it is possible to hang various containers or bundle various members together. When adjusting the diameter of the ring, the tab portion is operated to unhook the engaging portion from the tooth, after which the strip portion is pulled in a direction out of the through hole or passed deeper into the through hole, thereby engaging a different tooth to the engaging portion. When turning the strip portion in the ring form back into a flat shape, the strip portion is pulled out of the through hole similarly after the engaging portion is unhooked from the tooth.

CITATION LIST

Patent Document

PATENT DOCUMENT 1: Japanese Laid-Open Patent Publication No. 2003-47139

SUMMARY OF THE INVENTION

Technical Problem

With the band of Patent Document 1, however, when forming the strip portion into a ring, it is necessary to pass the strip portion into the through hole from the distal portion thereof, thus resulting in a troublesome operation. When turning the strip portion back into the original shape from the ring form, it is necessary to pull the strip portion out of the through hole by the amount it has been passed into the through hole, thus also resulting in a troublesome operation. In addition, while the strip portion is moved through the through hole when forming the strip portion into a ring, when turning it back into the original shape and when adjusting the diameter of the ring, the teeth may get caught on the engaging portion because the engaging portion is present on the inner periphery of the through hole, and the teeth may get caught on edges of the through hole other than the engaging portion. As described above, with the band of Patent Document 1, a troublesome operation is required, and it is difficult to quickly perform the operation.

BAND AND BAG SET

TECHNICAL FIELD

The present invention relates to a band for use in hanging various containers or bundling various members together, and a bag set including such a band.

BACKGROUND ART

As disclosed in Patent Document 1, for example, a band of this type known in the prior art is so configured that a bendable strip portion is formed into, and held as, a ring during use. The proximal portion of the strip portion includes a through hole through which the strip portion is passed from the distal portion thereof, and the intermediate portion of the strip portion includes many teeth formed in series of a saw-toothed pattern. A engaging portion for engaging a tooth is provided on the inner periphery of the through hole. The engaging portion can be moved by operating a tab portion integral with the engaging portion.

When using the band, first, the strip portion is bent and the distal portion is passed into the through hole, thereby forming the strip portion into a ring. When the strip portion is passed The present invention has been made in view of the above, and has an object to provide a band that is used in a ring form kept by engaging teeth to engaging means, wherein the operation can be performed easily and quickly.

Solution to the Problem

In the present invention, in order to achieve the object set forth above, engaging means are formed in a proximal portion of the strip portion while being spaced apart from each other in the width direction for respectively engaging teeth formed on opposite sides of the strip portion in the width direction, with a release portion formed between these engaging means so that the strip portion can be moved into and out by using the release portion.

Specifically, a first aspect is directed to a strip portion including a proximal portion, an intermediate portion and a distal portion; engaging means formed on a surface of the proximal portion in one thickness direction thereof; and a plurality of teeth formed in series in a longitudinal direction of the strip portion in at least a portion of the distal portion and the intermediate portion, wherein the strip portion is formed into a ring by bending at least a portion of the strip portion, overlapping a portion of an area from the distal portion to the intermediate portion on the surface of the proximal portion in one thickness direction, and engaging one of the teeth to the engaging means, and a diameter of the ring is configured to be adjusted by selecting one of the teeth engaged to the engaging means, the teeth are formed on opposite sides of the strip portion in a width direction, a plurality of the engaging means are formed spaced apart from each other in the width direction of the proximal portion so as to respectively engage the teeth on opposite sides of the strip portion in the width direction, and a release portion is provided between the engaging means for allowing the portion of the distal portion and the intermediate portion where the teeth are formed to be moved into and out of a space between the engaging means.

With this configuration, when holding the strip portion in a ring, the intermediate portion of the strip portion, for example, is bent, and the intermediate portion is inserted, through the release portion, into the space between the engaging means, overlapping the intermediate portion on the surface of the proximal portion in one thickness direction, and engaging the teeth to the engaging means. When turning the strip portion in a ring form back into the original shape, the intermediate portion is pulled out, via the release portion, from the space between the engaging means, thereby allowing the teeth to be unhooked from the engaging means. When adjusting the diameter of the ring, the teeth are unhooked from the engaging means as described above and the intermediate portion is pulled out, via the release portion, from the space between the engaging means, after which different portions of the strip portion are bent so as to achieve an intended diameter, and the intermediate portion, for example, is inserted into the space between the engaging means through the release portion so as to engage other teeth to the engaging means. Note that teeth in the distal portion may be engaged to, and unhooked from, the engaging means, as described above.

That is, when forming the strip portion into a ring by engaging the teeth to the engaging means, when turning the strip portion back into the original shape by unhooking the teeth from the engaging means, and when adjusting the diameter of the ring, it is not necessary, as is in the prior art, to move the strip portion through the through hole, but the strip portion can be moved into and out of the space between the engaging means via the release portion, and therefore the teeth of the strip portion will not get caught on the engaging means.

A second aspect is according to the first aspect, wherein the engaging means includes a stopper portion for preventing the tooth from being unhooked in a thickness direction of the strip portion.

With this configuration, it is possible with the stopper portion to prevent the tooth from being unhooked in a state where the tooth is engaged to the engaging means.

A third aspect is according to the second aspect, wherein the stopper portion is spaced apart from the surface of the proximal portion in one thickness direction in the thickness direction of the strip portion.

With this configuration, the tooth engaged to the engaging means is located between the surface of the proximal portion in one thickness direction and the stopper portion, thereby preventing the tooth from moving in the thickness direction of the strip portion.

A fourth aspect is according to the second or third aspect, wherein the stopper portion includes a guide surface formed thereon for guiding the strip portion into the space between the engaging means.

With this configuration, when a portion of the strip portion where the teeth are formed is inserted into the space between the engaging means, the strip portion is guided by the guide surface of the stopper portion.

A fifth aspect is according to one of the first to fourth aspects, wherein the proximal portion of the strip portion is formed wider than the intermediate portion and the distal portion.

With this configuration, since the proximal portion is formed wider than the intermediate portion and the distal portion, the proximal portion can be held firmly by hand when engaging the teeth to the engaging means or when unhooking the teeth from the engaging means.

A sixth aspect is according to one of the first to fifth aspects, wherein a thick portion, which is thicker than a central portion of the proximal portion in the width direction, is formed on each side of the proximal portion in the width direction, and the engaging means is integral with the thick portions.

With this configuration, a central portion of the proximal portion in the width direction is more easily deformed as compared with the opposite side portions. Therefore, the engaging means can be easily displaced when unhooking the teeth from the engaging means.

A seventh aspect is according to one of the first to sixth aspects, wherein the engaging means include protruding portions protruding from the surface of the proximal portion in one thickness direction and facing each other in the width direction of the proximal portion.

With this configuration, the protruding portions engage the teeth from opposite sides of the strip portion in the width direction.

An eighth aspect is according to one of the first to seventh aspects, wherein the proximal portion of the strip portion includes a weakened portion provided between the engaging means.

With this configuration, a portion of the proximal portion between the engaging means is easily deformed. Thus, it is possible to easily displace the engaging means.

A ninth aspect is according to the eighth aspect, wherein the weakened portion is a hole running through the proximal portion of the strip portion in the thickness direction.

With this configuration, the structure of the weakened portion is simple.

A tenth aspect is directed to a bag set including, as a set, the band as set forth above and a bag.

Advantages of the Invention

According to the first aspect, teeth are formed on opposite sides of the strip portion in the width direction, and a plurality of engaging means are formed spaced apart from each other in the width direction of the strip portion so as to engage the teeth on opposite sides, with a release portion for allowing the strip portion to be moved into and out of the space between the engaging means. Therefore, when forming the strip portion into a ring, when turning it back into the original shape, and when adjusting the diameter of the ring, the teeth of the strip portion will not get caught on the engaging means, and the operation can be performed easily and quickly.

According to the second aspect, it is possible, with the stopper portion, to prevent the teeth from being unhooked inadvertently in a state where the teeth are engaged to the engaging means. Therefore, the strip portion can be held in a ring form even if a large load acts upon the strip portion in a ring form.

According to the third aspect, since the stopper portion is spaced apart, in the thickness direction of the strip portion, from the surface of the proximal portion in one thickness direction, the teeth engaged to the engaging means are located between the surface of the proximal portion and the stopper portion, and it is possible to reliably prevent the teeth from being unhooked inadvertently from the engaging means.

According to the fourth aspect, the portion of the strip portion where the teeth are formed can be guided by the guide surface of the stopper portion into the space between the engaging means, and it is therefore possible to easily engage the teeth to the engaging means.

According to the fifth aspect, since the proximal portion of the strip portion is formed wider than the intermediate portion and the distal portion, the proximal portion can be held firmly when engaging the teeth to the engaging means or when unhooking the teeth from the engaging means, thereby improving the usability.

According to the sixth aspect, since a thick portion is formed on each side of the proximal portion in the width direction, and the engaging means is integral with the thick portion, the engaging means can be easily displaced when unhooking the teeth from the engaging means, thereby further improving the usability.

According to the seventh aspect, since the engaging means include protruding portions facing each other in the width direction of the proximal portion, it is possible to reduce the play of the strip portion in the width direction in a state where the teeth are engaged to the engaging means.

According to the eighth aspect, since the proximal portion of the strip portion includes a weakened portion provided between the engaging means, the engaging means can be easily displaced, thereby further improving the usability.

According to the ninth aspect, it is possible to easily obtain the weakened portion.

According to the tenth aspect, the operation of hanging a bag or fixing a bag to a fixture can be performed easily and quickly.

DESCRIPTION OF REFERENCE CHARACTERS

Figure 1:
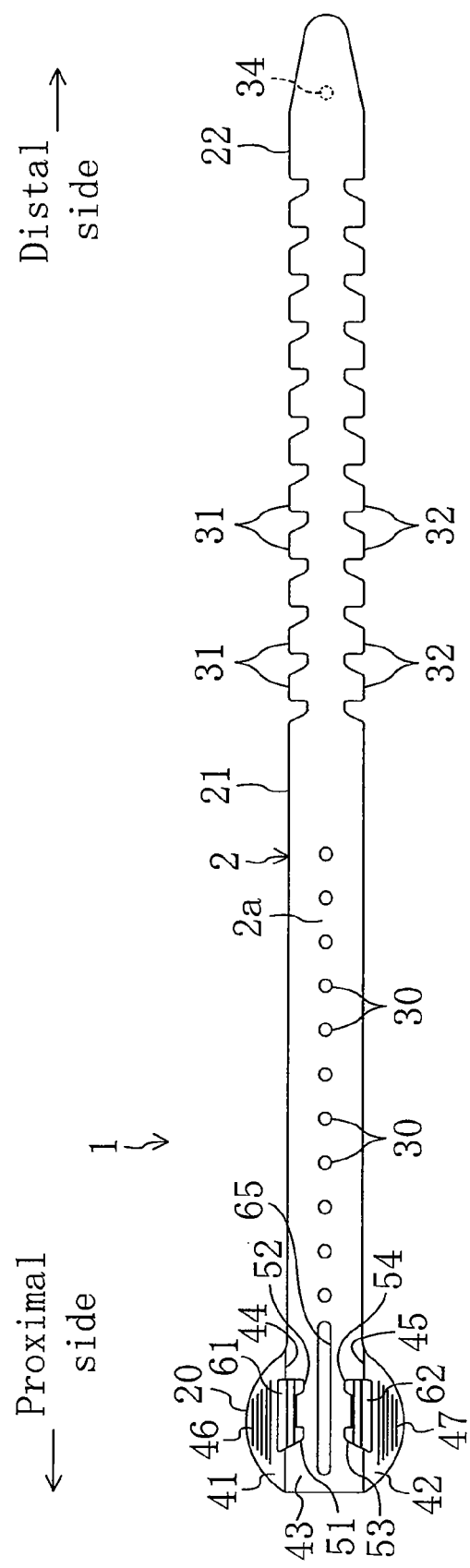
FIG. 1 is a plan view of a band of an embodiment.

1 Band
2 Strip portion
20 Proximal portion
21 Intermediate portion
22 Distal portion
31, 32 First teeth, second teeth
41, 42 First thick portion, second thick portion
51-54 First to fourth protruding portions (protruding portions)
61, 62 First stopper portion, second stopper portion
61*a*, 62*a* First opposing surface, second opposing surface (guide surface)
65 Hole (weakened portion)
70 Groove (weakened portion)
71 Hole (weakened portion)
S Release portion

DESCRIPTION OF EMBODIMENTS

Embodiments of the present invention will now be described in detail with reference to the drawings. Note that the following description of preferred embodiments is merely illustrative of the present invention, and is not intended to limit the present invention or the application and uses thereof.

Figure 2:
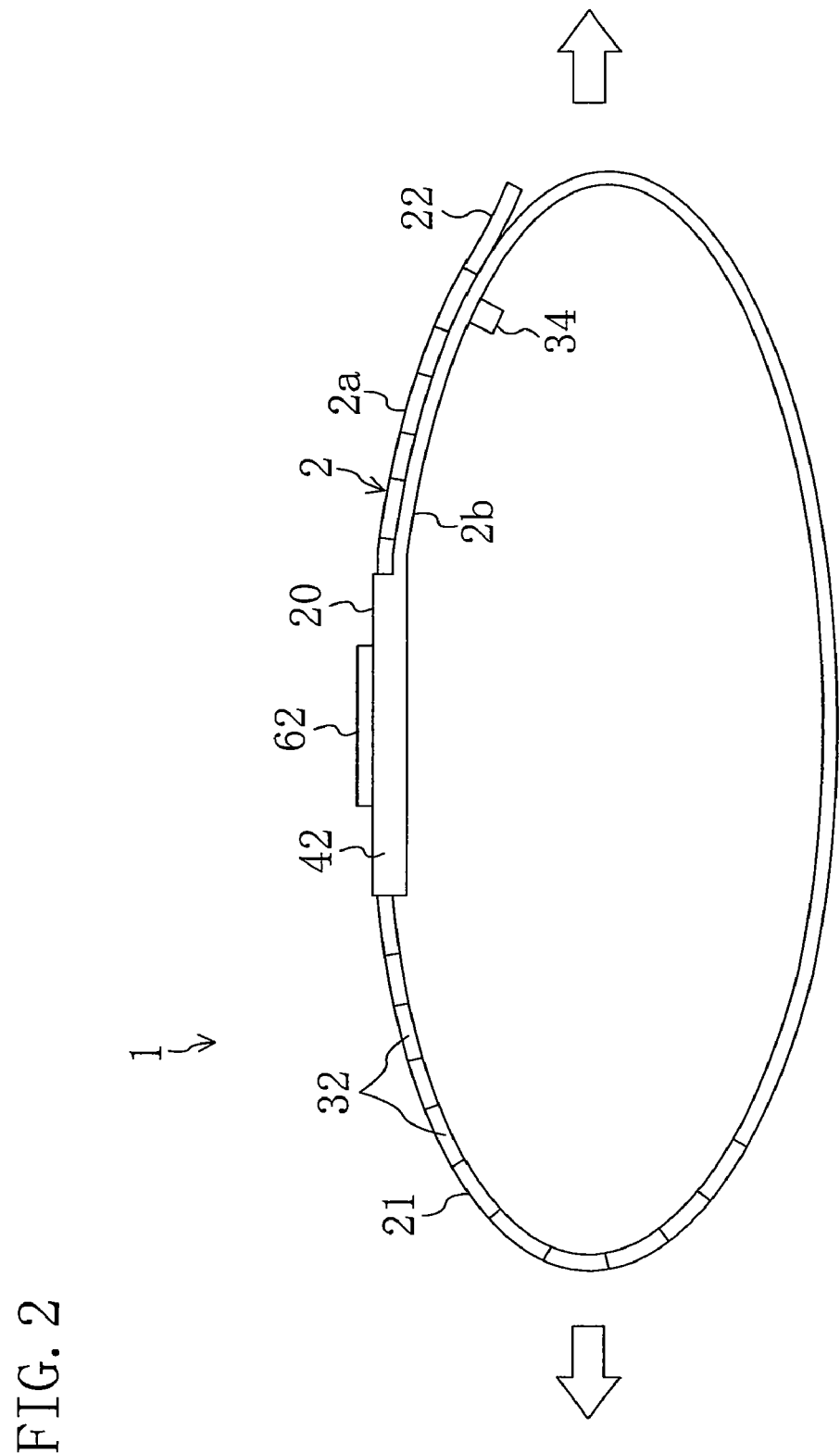
FIG. 2 is a side view of the band of which the strip portion has been formed into a ring.
Figure 3:
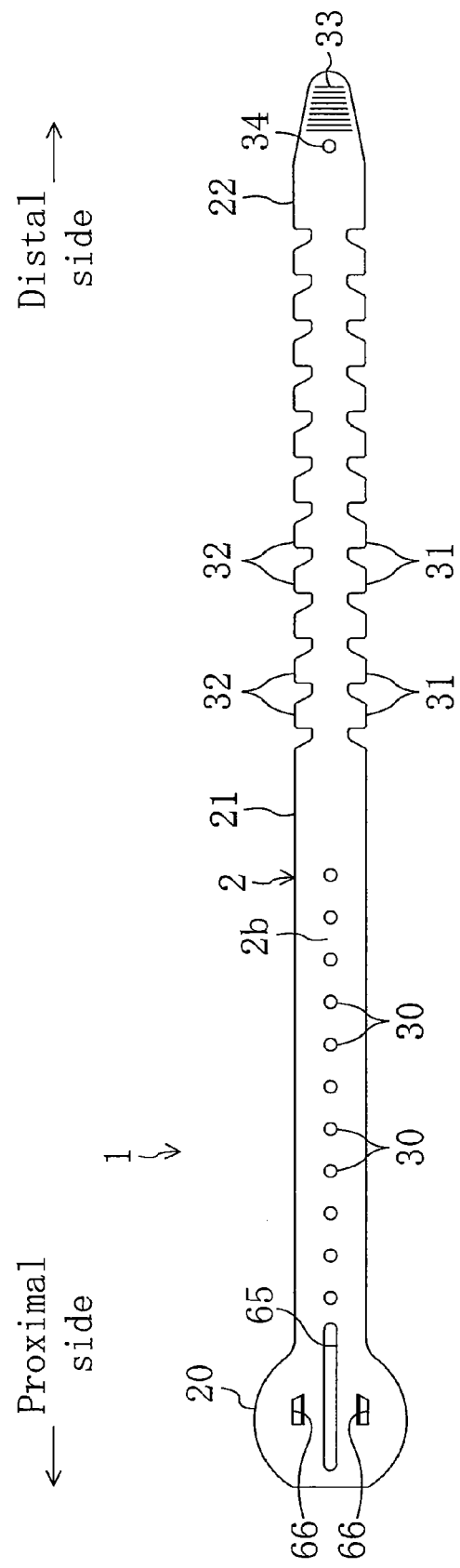
FIG. 3 is a bottom view of the band.
Figure 4:
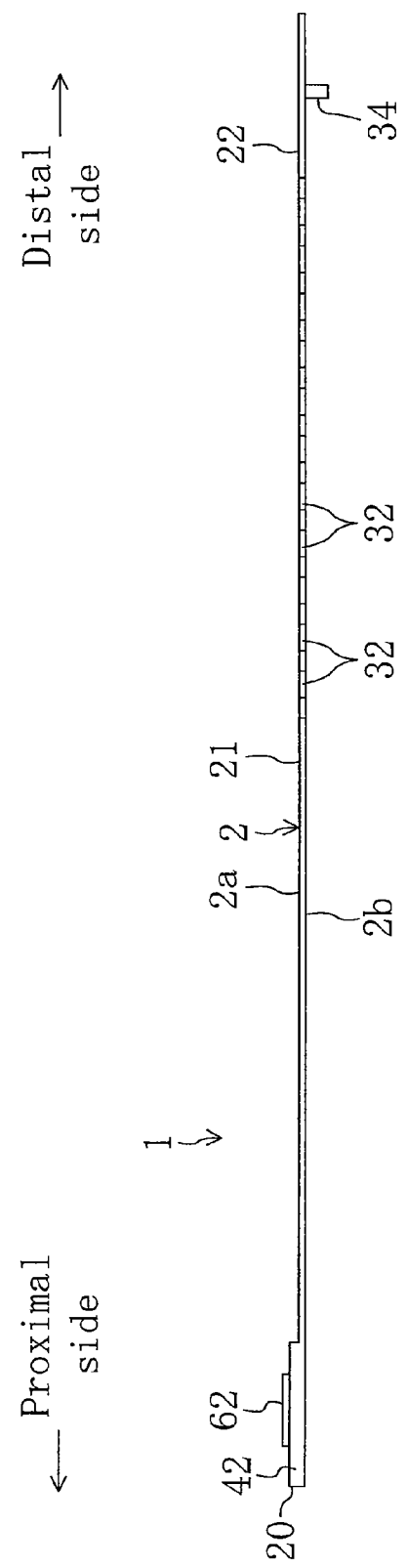
FIG. 4 is a side view of the band.

FIG. 1 shows a band 1 according to an embodiment of the present invention. The band 1 is an integral molded product obtained by molding a flexible resin material, and can be used for hanging various containers or for bundling various members together, for example. The resin material molded into the band 1 may be, for example, polyethylene, polypropylene, or the like, but it is not limited thereto. It is in a ring shape as shown in FIG. 2 when used, and it is in a generally flat plate shape as shown in FIGS. 3 and 4 when not used.

The band 1 includes a strip portion 2, wherein an upper surface 2*a* of the strip portion 2 is the surface to be the outer periphery surface when in a ring form, and a reverse surface 2*b* of the strip portion 2 is the surface to be the inner periphery surface. The strip portion 2 includes a proximal portion (the left end portion in FIGS. 1, 3 and 4) 20, an intermediate portion 21, and a distal portion (the right end portion in FIGS. 1, 3 and 4) 22. The width of the proximal portion 20 is set to be wider than the width of the distal portion 22 and the intermediate portion 21. Many engagement holes 30, 30, . . . , are formed in a proximal end portion of the intermediate portion 21, and many first teeth 31, 31, . . . , and second teeth 32, 32, . . . , are formed in a distal end portion of the intermediate portion 21. That is, the widest portion of the strip portion 2 is the proximal portion 20, and the portion on the distal end side of the first and second teeth 31 and 32 is the distal portion 22. The thickness of the intermediate portion 21 and that of the distal portion 22 are set to be equal to each other.

The distal portion 22 is formed in a tapered shape whose width decreases toward the distal end of the strip portion 2. The distal portion of the distal portion 22 is rounded. As shown in FIG. 3, a plurality of ridge portions 33, 33, . . . , extending in the width direction are formed with an interval therebetween in the longitudinal direction of the strip portion 2 at the distal end of the reverse surface of the distal portion 22. The ridge portions 33, 33, . . . , serve as non-slip means for holding the distal portion 22 by hand. As shown in FIG. 4, an engagement protrusion 34 is formed on the proximal end side of the ridge portions 33 on the reverse surface of the distal portion 22. The engagement protrusion 34 is in a cylindrical shape and is placed at generally the central portion in the width direction. The axial line of the engagement protrusion 34 is perpendicular to the reverse surface of the distal portion 22.

Many first teeth 31, 31, . . . , are formed in series in the longitudinal direction of the strip portion 2 on one side of the intermediate portion 21 in the width direction (the upper side in FIG. 1), and many second teeth 32, 32, . . . , are similarly formed on the other side in the width direction (the lower side in FIG. 1). With the first and second teeth 31 and 32, the opposite sides of the intermediate portion 21 in the width direction are in a saw-toothed shape. The first teeth 31 and the second teeth 32 are placed at the same position with respect to the longitudinal direction of the intermediate portion 21.

Figure 5:
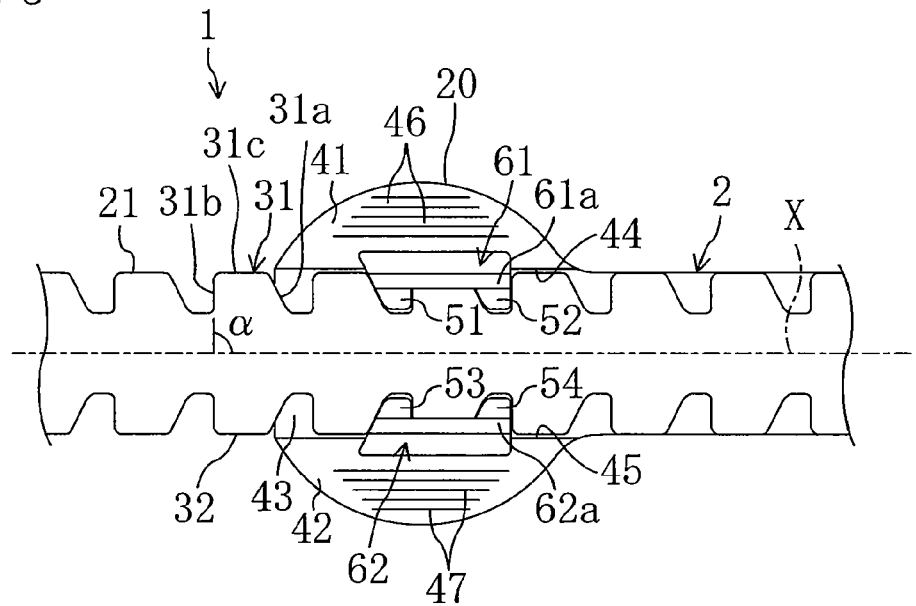
FIG. 5 is a plan view showing, on an enlarged scale, a portion of the band of which the strip portion has been formed into a ring.

As shown in FIG. 5, an edge portion 31*a* of each first tooth 31 on the distal end side of the strip portion 2 extends along a straight line. An edge portion 31*b* of each first tooth 31 on the proximal end side of the strip portion 2 extends along a straight line in a direction perpendicular to the center line X extending in the longitudinal direction of the strip portion 2. While the angle α formed between the edge portion 31*b* and the center line X extending in the longitudinal direction of the strip portion 2 is set to 90° in the present embodiment, it is not limited thereto, and the angle α may be any angle within a range of 80° or more and 120° or less. An outer edge portion 31*c* of each first tooth 31 extends in the longitudinal direction of the strip portion 2. The second teeth 32 have the same shape as the first teeth 31, and the edge portions of each second tooth 32 extend similarly to the edge portions 31*a*-31*c* of the first tooth 31.

As shown in FIG. 2, the engagement holes 30 of the intermediate portion 21 are formed so that the engagement protrusion 34 of the distal portion 22 can fit in and engage with an engagement hole 30. The engagement holes 30 are formed in a generally circular shape, and are formed with an interval therebetween in the longitudinal direction of the strip portion 2 in the central portion of the intermediate portion 21 in the width direction. The interval between the engagement holes 30 is set to be equal to the interval between the first teeth 31.

Figure 6:
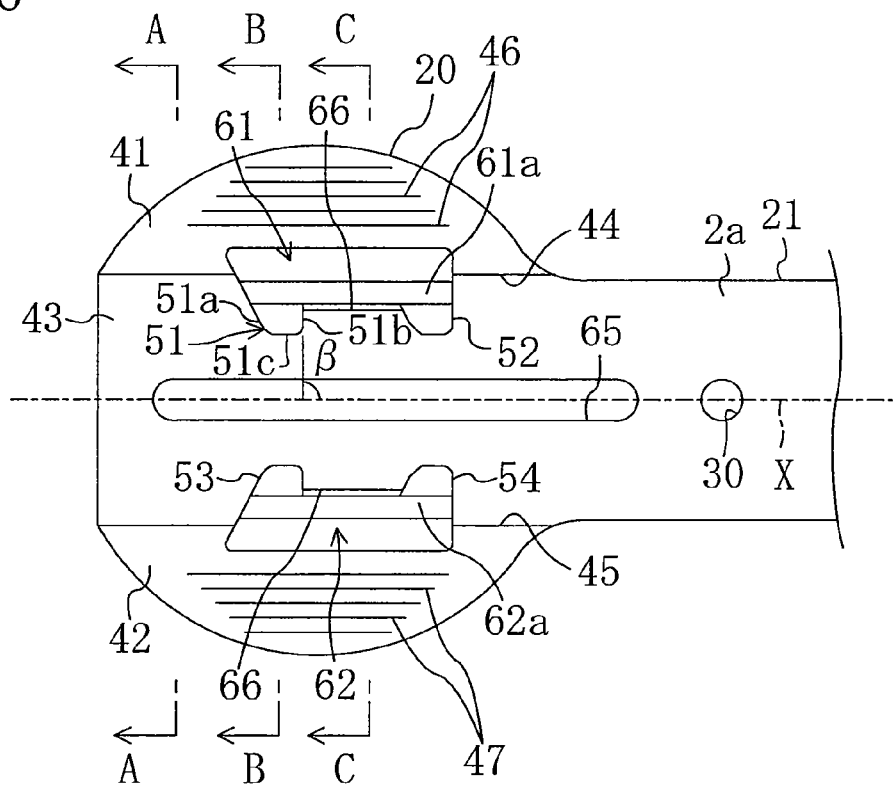
FIG. 6 is a plan view showing, on an enlarged scale, a proximal portion of the strip portion.

As shown in FIGS. 1, 3 and 6, the edge portion of the proximal portion 20 on the proximal end side is formed along a straight line perpendicular to the longitudinal direction of the strip portion 2 as viewed from above. The opposite edge portions of the proximal portion 20 in the width direction are both in an arc shape as viewed from above, and are continuous with the edge portion on the proximal end side. That is, the width size of the proximal portion 20 is greatest in the central portion thereof in the longitudinal direction (the direction of the center line X in FIG. 6), and decreases toward either end thereof in the longitudinal direction. Since the opposite edge portions of the proximal portion 20 in the width direction each have a corner-less arc shape, one will not feel a pain when holding the proximal portion 20 by hand, and the proximal portion 20 will not get caught on other members.

Figure 7:
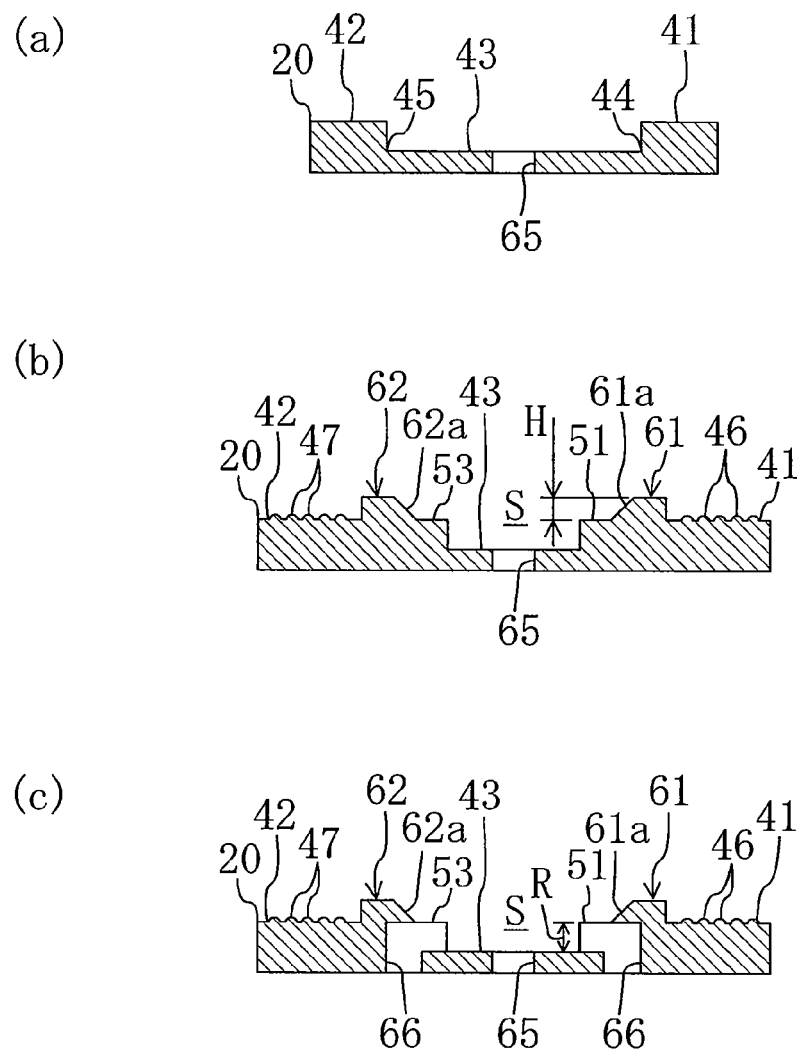
FIG. 7(*a*) is a cross-sectional view taken along line A-A of FIG. 6, FIG. 7(*b*) is a cross-sectional view taken along line B-B of FIG. 6, and FIG. 7(*c*) is a cross-sectional view taken along line C-C of FIG. 6.

As shown in FIG. 7, on opposite sides of the proximal portion 20 in the width direction, a first thick portion 41 and a second thick portion 42, which are thicker than the central portion in the width direction, are formed so as to protrude in the direction of the upper surface 2a of the strip portion 2, and a thin portion 43 having the same thickness as that of the intermediate portion 21 and the distal portion 22 is formed between the first and second thick portions 41 and 42. As shown in FIG. 7(a), the first thick portion 41 and the thin portion 43 together form a first step portion 44 on the upper surface of the proximal portion 20 and, similarly, the second thick portion 42 and the thin portion 43 together form a second step portion 45. The interval between the first and second thick portions 41 and 42 is set so that the intermediate portion 21 and the distal portion 22 can be inserted into the space between the thick portions 41 and 42, i.e., generally equal to, or slightly larger than, the width size of the intermediate portion 21. As shown in FIGS. 6 and 7, a plurality of ridge portions 46, 46, . . . , and ridge portions 47, 47, . . . , extending in the longitudinal direction of the strip portion 2, are formed with an interval therebetween in the width direction on the upper surface of the first and second thick portions 41 and 42. The ridge portions 46 and 47 serve as non-slip means for holding the first and second thick portions 41 and 42 by hand.

First to fourth protruding portions 51-54 are formed on the thin portion 43. As shown in FIG. 5, the first tooth 31 is engaged to the first and second protruding portions 51 and 52, and the second tooth 32 is engaged to the third and fourth protruding portions 53 and 54. As shown in FIG. 6, the first and second protruding portions 51 and 52 protrude from the upper surface of the thin portion 43, and are continuous with the first thick portion 41, while extending toward the second thick portion 42. The third and fourth protruding portions 53 and 54 protrude from the upper surface of the thin portion 43, and are continuous with the second thick portion 42, while extending toward the first thick portion 41. The first to fourth protruding portions 51-54 protrude from the upper surface of the thin portion 43 by an equal amount, which is set to be greater than the thickness size of the intermediate portion 21 and the distal portion 22. Note that the amount by which the first to fourth protruding portions 51-54 protrude from the upper surface of the thin portion 43 may be equal to the thickness size of the intermediate portion 21 and the distal portion 22. The amount by which the first to fourth protruding portions 51-54 protrude from the upper surface of the thin portion 43 is set to be preferably less than or equal to 2.0 times, and more preferably 1.4 times, the thickness size of the intermediate portion 21 and the distal portion 22.

The first protruding portion 51 and the second protruding portion 52 are placed with a predetermined interval therebetween in the longitudinal direction of the strip portion 2. The interval corresponds to the shape of the first teeth 31, and is set so that the first teeth 31 can each fit in between the protruding portions 51 and 52. The third protruding portion 53 and the fourth protruding portion 54 are similarly placed with an interval therebetween. The first protruding portion 51 and the third protruding portion 53 are placed with an interval therebetween in the width direction of the proximal portion 20 while opposing each other in the width direction of the proximal portion 20. The second protruding portion 52 and the fourth protruding portion 54 are similarly placed with an interval therebetween in the width direction of the proximal portion 20 and are opposing each other.

An edge portion 51a of the first protruding portion 51 on the proximal end side of the strip portion 2 is inclined so that portions thereof closer to the second thick portion 42 are located closer to the distal end of the strip portion 2. The edge portion 51a on the proximal end side conforms with the edge portion 31a of the first teeth 31. On the other hand, an edge portion 51b of the first protruding portion 51 on the distal end side of the strip portion 2 extends generally perpendicular to the center line X extending in the longitudinal direction of the strip portion 2, and conforms with the edge portion 31b of the first teeth 31. That is, as shown in FIG. 6, the angle β formed between the edge portion 51b of the first protruding portion 51 and the center line X extending in the longitudinal direction of the strip portion 2 is set to be equal to the angle α. An edge portion 51c of the first protruding portion 51 opposing the third protruding portion 53 extends in the longitudinal direction of the strip portion 2, and conforms with the edge portion 31c of the first teeth 31. That is, the first protruding portion 51 has a shape corresponding to the shape of each first tooth 31. The second to fourth protruding portions 52-54 have the same shape as that of the first protruding portion 51, and edge portions of the second to fourth protruding portions 52-54 extend similarly to the edge portions 51a-51c of the first protruding portion 51.

A first stopper portion 61 is formed on, and integral with, the upper surface of the first thick portion 41, and a second stopper portion 62 is formed on, and integral with, the upper surface of the second thick portion 42. The first stopper portion 61, the first protruding portion 51 and the second protruding portion 52 together form engaging means for engaging the first teeth 31, and the second stopper portion 62, the third protruding portion 53 and the fourth protruding portion 54 together form engaging means for engaging the second teeth 32.

The first and second stopper portions 61 and 62 are opposing each other in the width direction of the proximal portion 20. The first stopper portion 61 protrudes from the upper surface of the first thick portion 41, and extends from the first protruding portion 51 to the second protruding portion 52 along an edge portion of the first thick portion 41 on the side of the thin portion 43. That is, the first protruding portion 51 and the second protruding portion 52 are coupled with each other by the first stopper portion 61. Similarly, the second stopper portion 62 extends so as to couple together the third protruding portion 53 and the fourth protruding portion 54. The protrusion height H (shown in FIG. 7(b)) of the first stopper portion 61 from the upper surface of the first thick portion 41 is set to be 0.5 mm or more and 3.0 mm or less. The protrusion height of the second stopper portion 62 is set similarly to this.

The space between the first stopper portion 61 and the second stopper portion 62 is open, and the open space serves as a release portion S between the first and second protruding portions 51 and 52 and the third and fourth protruding portions 53 and 54. The release portion S serves to allow a portion of the intermediate portion 21 where the first and second teeth 31 and 32 are formed to be moved into and out of the space between the first and second protruding portions 51 and 52 and the third and fourth protruding portions 53 and 54.

The first stopper portion 61 protrudes from the first thick portion 41 toward the second thick portion 42. The separation size R (shown in FIG. 7(c)) between the first stopper portion 61 and the upper surface of the thin portion 43 is set to be greater than the thickness of the intermediate portion 21 and the distal portion 22 by a factor of 1.0 or more and 2.0 or less. An opposing surface 61a of the first stopper portion 61 opposing the second stopper portion 62 is inclined in such a direction that portions thereof further away from the thin portion 43 in the thickness direction are located further away from the second stopper portion 62. An opposing surface 62a of the second stopper portion 62 is also inclined similarly.

Figure 8:
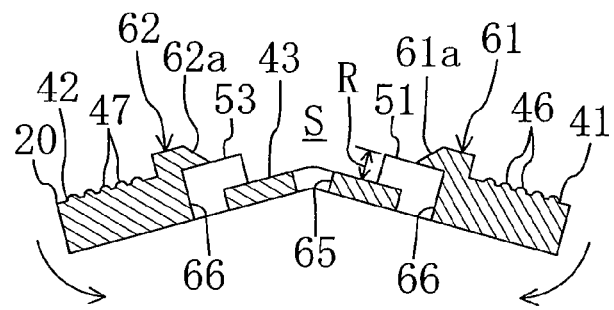
FIG. 8 is a view corresponding to FIG. 7(*c*) where the proximal portion is bent.

A hole (weakened portion) 65 extending in the longitudinal direction of the strip portion 2 is formed in the thin portion 43 of the proximal portion 20. The hole 65 is positioned in the central portion of the proximal portion 20 in the width direction, and serves to weaken the central portion of the proximal portion 20 in the width direction as compared with other portions. With the formation of the hole 65, the proximal portion 20 can be bent more easily at around the central portion in the width direction, as shown in FIG. 8. The length of the hole 65 is preferably set to be 40 mm or less. The width of the hole 65 is preferably set to be 0.5 mm or more and 7.0 mm or less, and is more preferably set to be 4.0 mm or less. The sizes of the hole 65 are not limited to those described above, but may be set otherwise as appropriate.

Note that reference numeral 66 in the figures denotes through holes that are left void when a mold is taken out in the molding process.

Figure 9:
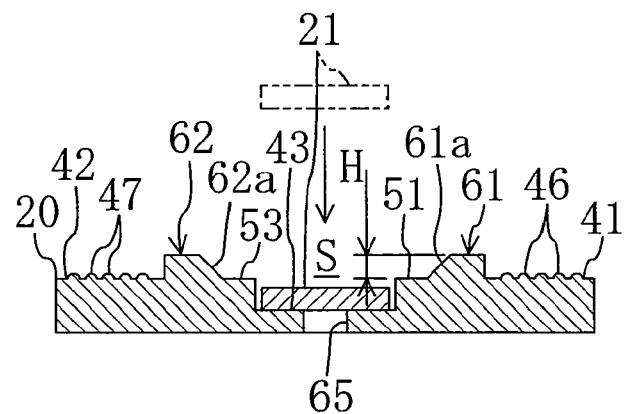
FIG. 9 shows the strip portion in a ring form, where FIG. 9(*a*) corresponds to FIG. 7(*b*), and FIG. 9(*b*) corresponds to FIG. 7(*c*).
Figure 9:
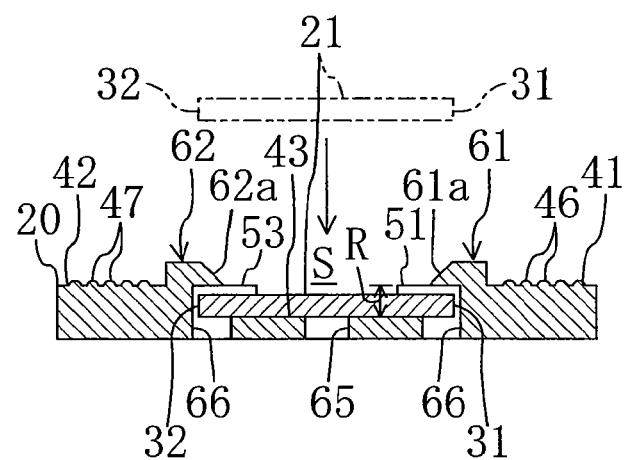

Next, how the band 1 having such a configuration is used will be described. First, when forming a ring, the intermediate portion 21 of the strip portion 2 is bent as shown in FIG. 2. Then, as shown in FIG. 9, the intermediate portion 21 is inserted, through the release portion S, into the space between the first and second protruding portions 51 and 52 and the third and fourth protruding portions 53 and 54. In this process, since the opposing surface 61a of the first stopper portion 61 is inclined as described above, the first tooth 31 can be pushed toward the thin portion 43, whereby the first tooth 31 slides on the opposing surface 61a while being deformed elastically and gets over the first stopper portion 61 so as to be engaged to the first and second protruding portions 51 and 52. Similarly, the second tooth 32 slides on the opposing surface 62a of the second stopper portion 62 while being deformed elastically and gets over the second stopper portion 62 so as to be engaged to the third and fourth protruding portions 53 and 54. That is, the strip portion 2 is guided by the opposing surfaces 61a and 62a into the space between the protruding portions 51 and 52 and the protruding portions 53 and 54, and therefore the opposing surfaces 61a and 62a serve as the guide surface of the present invention.

When the first tooth 31 and the second tooth 32 are engaged to the first to fourth protruding portions 51-54 and the first and second stopper portions 61 and 62, the intermediate portion 21 is laid on the upper surface of the thin portion 43 of the proximal portion 20. When engaging the first teeth and the second teeth 31 and 32, the proximal portion 20 may be deformed so as to move the first stopper portion 61 and the second stopper portion 62 away from each other, as shown in FIG. 8. Then, the first tooth 31 and the second tooth 32 can be easily engaged to the protruding portions 51-54 and the first and second stopper portions 61 and 62. After the first teeth and the second teeth 31 and 32 are engaged to the protruding portions 51-54 and the first and second stopper portions 61 and 62, the engagement protrusion 34 is fitted into, and engaged with, the engagement hole 30.

When a tensile load is applied in the direction of outline arrows in FIG. 2, for example, with the band 1 being in a ring form, the first and second teeth 31 and 32 are prevented by the first and second stopper portions 61 and 62 from being unhooked in the thickness direction of the strip portion 2 and are kept engaged with the protruding portions 51-54, as shown in FIG. 9(b). Moreover, since the engagement protrusion 34 is engaged with the engagement hole 30, the distal portion 22 of the strip portion 2 is unlikely to be lifted off the intermediate portion 21 when a tensile load is applied. This also makes it more unlikely that the first and second teeth 31 and 32 are unhooked from the protruding portions 51-54. Since the first tooth 31 is located between the first protruding portion 51 and the second protruding portion 52 and the second tooth 32 is located between the third protruding portion 53 and the fourth protruding portion 54, the intermediate portion 21 does not move in either longitudinal direction, and the diameter of the ring does not increase or decrease. Note that when forming the ring, the distal portion 22 may be bent, or the proximal portion 20 may be bent.

Figure 10:
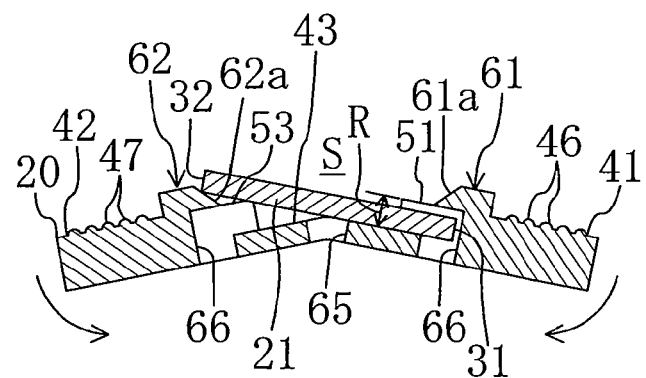
FIG. 10 is a view corresponding to FIG. 9(*b*) illustrating a case where teeth are unhooked from stopper portions.

Next, how the strip portion 2 in a ring form is turned back into the original shape will be described. First, the first thick portion 41 and the second thick portion 42 are held by hand, and the proximal portion 20 is bent in such a direction that the stopper portions 61 and 62 are moved away from each other, as shown in FIG. 10. Then, the first tooth 31 is unhooked from the first and second protruding portions 51 and 52, and the second tooth 32 is unhooked from the third and fourth protruding portions 53 and 54. Then, the intermediate portion 21 is pulled out, via the release portion S, from the space between the first and second protruding portions 51 and 52 and the third and fourth protruding portions 53 and 54.

When adjusting the diameter of the ring, the first and second teeth 31 and 32 may be unhooked from the first to fourth protruding portions 51-54 as described above, and then the strip portion 2 may be bent so as to achieve an intended diameter, whereupon another set of first and second teeth 31 and 32 are engaged to the first to fourth protruding portions 51-54 and the first and second stopper portions 61 and 62.

As described above, the band 1 of the present embodiment includes the first teeth 31 and the second teeth 32 formed on opposite sides of the strip portion 2 in the width direction, the first to fourth protruding portions 51-54 and the first and second stopper portions 61 and 62 formed in the proximal portion 20 so as to hold the first teeth 31 and the second teeth 32, with the release portion S provided serving to allow the strip portion 2 to be moved into and out of the space between the first protruding portion 51, the second protruding portion 52 and the first stopper portion 61, and the third protruding portion 53, the fourth protruding portion 54 and the second stopper portion 62. Therefore, when turning the strip portion 2 into a ring, when turning it back into the original shape, and when adjusting the diameter of the ring, the first teeth 31 and the second teeth 32 of the strip portion 2 do not get caught on the protruding portions 51-54, thus realizing simple and quick operations. In a state where the first tooth 31 and the second tooth 32 are engaged to the first to fourth protruding portions 51-54, it is possible with the first and second stopper portions 61 and 62 to prevent these teeth 31 and 32 from being unhooked inadvertently, and to keep the strip portion 2 in a ring form.

Since the proximal portion 20 of the strip portion 2 is formed wider than the intermediate portion 21 and the distal portion 22, the proximal portion 20 can be held firmly when engaging the first teeth 31 and the second teeth 32 to the first to fourth protruding portions 51-54 or when unhooking them from the protruding portions 51-54, thus improving the usability.

Since the first and second thick portions 41 and 42 are formed on opposite sides of the proximal portion 20 in the width direction, with the first and second stopper portions 61 and 62 being integral with the thick portions 41 and 42, it is possible to easily displace the first and second stopper portions 61 and 62 when unhooking the first teeth 31 and the second teeth 32 from the first to fourth protruding portions 51-54, thus further improving the usability.

Since the first and second protruding portions 51 and 52 and the third and fourth protruding portions 53 and 54 are shaped so as to protrude from the upper surface of the proximal portion 20 while opposing each other, it is possible to reduce the play of the strip portion 2 in the width direction in a state where the first teeth 31 and the second teeth 32 are engaged to the first to fourth protruding portions 51-54.

Since the first and second stopper portions 61 and 62 are apart from the upper surface of the thin portion 43 in the thickness direction of the strip portion 2, the first teeth 31 and the second teeth 32 do not move in the thickness direction of the strip portion 2 in a state where the first teeth 31 and the second teeth 32 are engaged to the first to fourth protruding portions 51-54, and it is therefore possible to reliably prevent the first teeth 31 and the second teeth 32 from being unhooked inadvertently.

Since it is possible, with the opposing surfaces 61a and 62a of the first and second stopper portions 61 and 62, to guide the strip portion 2 into the space between the first and second protruding portions 51 and 52 and the third and fourth protruding portions 53 and 54, the first teeth 31 and the second teeth 32 can be easily engaged to the first to fourth protruding portions 51-54.

Since the hole 65 is provided in an area of the proximal portion 20 of the strip portion 2 between the first and second protruding portions 51 and 52 and the third and fourth protruding portions 53 and 54, it is possible to easily displace the first and second stopper portions 61 and 62 by deforming the proximal portion 20, thus further improving the usability.

Figure 11:
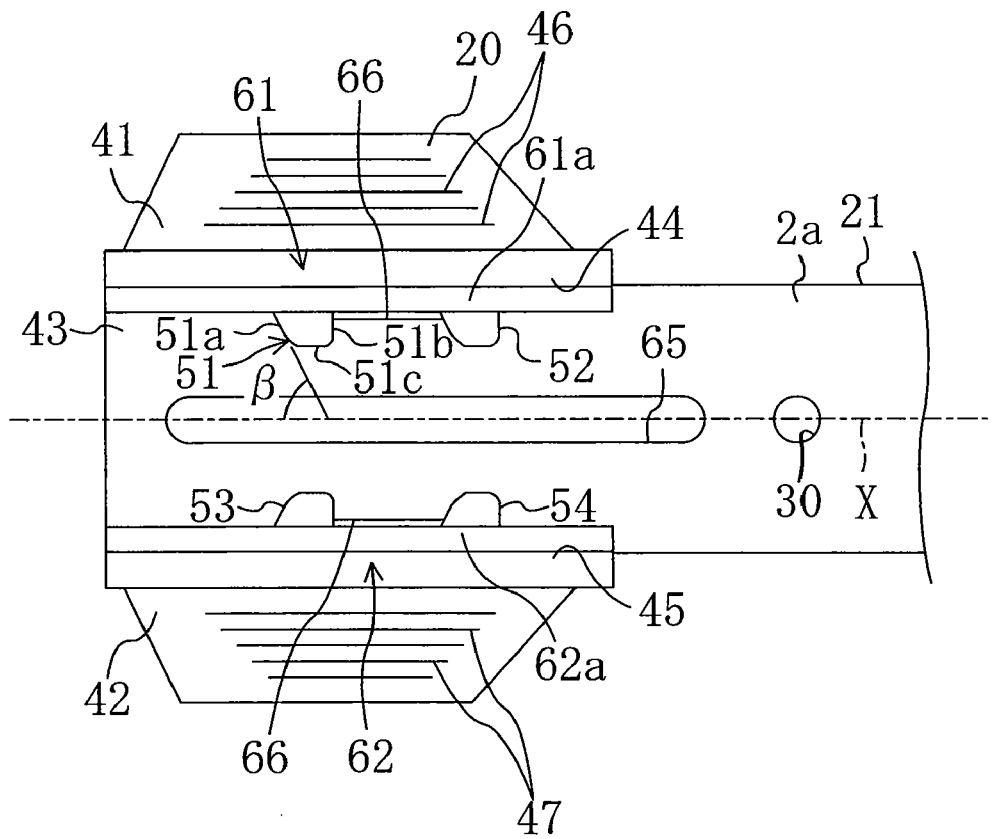
FIG. 11 is a view corresponding to FIG. 6 according to Variation 1.

Note that the shape of the edge portion of the proximal portion 20 may be a polygonal shape as in Variation 1 shown in FIG. 11. In Variation 1, the first stopper portion 61 is extended toward the proximal end of the strip portion 2 past the first protruding portion 51 and toward the distal end of the strip portion 2 past the second protruding portion 52. Thus, it is possible to hold a plurality of first teeth 31 by the first stopper portion 61. The second stopper portion 62 is extended similarly, and can hold a plurality of second teeth 32.

Figure 12:
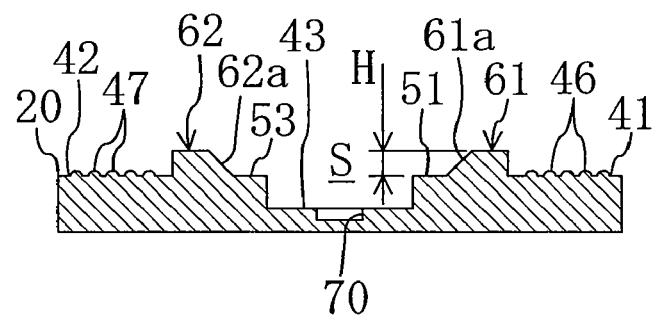
FIG. 12 is a view corresponding to FIG. 7(*b*) according to Variation 2.
Figure 13:
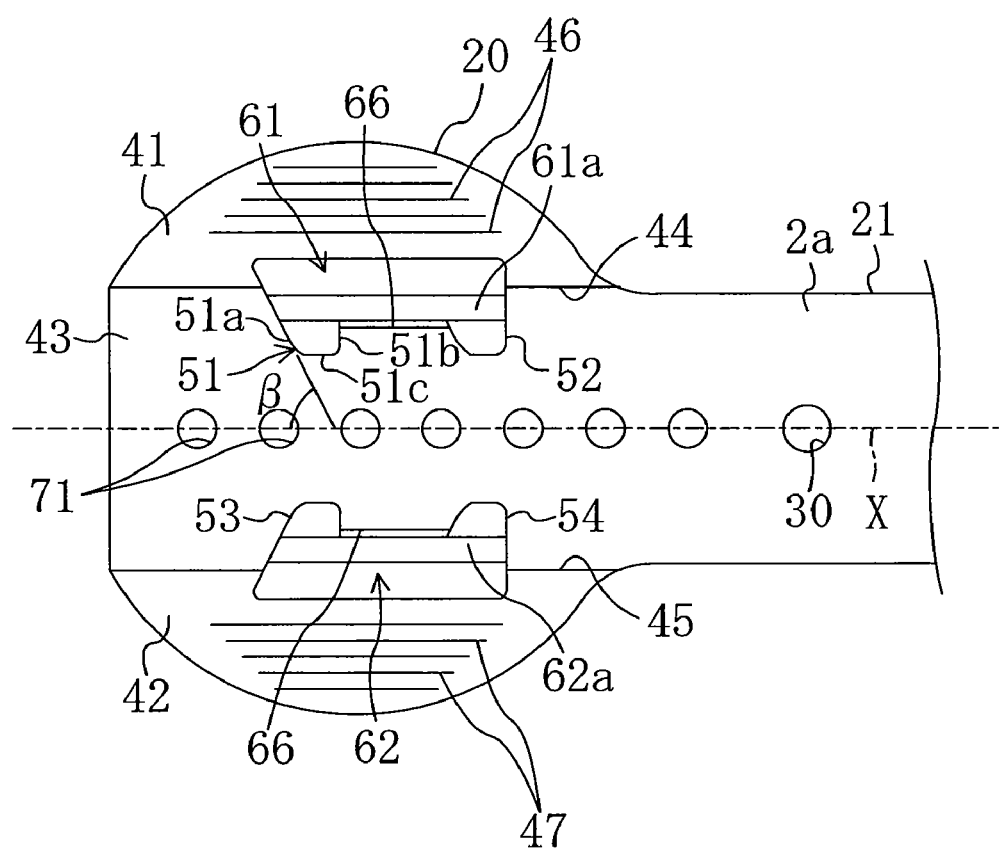
FIG. 13 is a view corresponding to FIG. 6 according to Variation 3.

While the weakened portion of the present invention is a single hole 65 running through the proximal portion 20 in the embodiment above, the present invention is not limited thereto. It may be a groove 70 as in Variation 2 shown in FIG. 12, or may be a plurality of holes 71, 71, . . . , as in Variation 3 shown in FIG. 13. Although not shown, the weakened portion may be a plurality of grooves or a combination of a groove and a hole. The weakened portion may be a thin hinge, or the like.

The teeth may be formed in the distal portion 22. One of the first and second stopper portions 61 and 62 may be omitted. While four protruding portions 51-54 are provided in the embodiment above, the number of protruding portions is not limited thereto.

A bag set may be provided, including the band 1 and a bag (container) as a set. The bag may be a urine bag, for example. A urine bag is a bag for holding urine drawn out of a patient in a clinical scene, and is well known in the art. In this case, the operation of hanging a urine bag can be done simply and quickly. It is also possible to prevent the hung urine bag from falling inadvertently, thereby improving the reliability of the medical procedure. The type of the bag is not limited to this, but may be any of various bags to be hung.

The band 1 may be provided, as a set, with any of various medical instruments.

INDUSTRIAL APPLICABILITY

As described above, the band of the present invention can be used for hanging various bags in a clinical scene, for example.

The invention claimed is:

1. A band comprising:
 a strip portion including a proximal portion, an intermediate portion and a distal portion;
 engaging means formed on a surface of the proximal portion in one thickness direction thereof; and
 a plurality of teeth formed in series in a longitudinal direction of the strip portion in at least a portion of the distal portion and the intermediate portion,
 wherein the strip portion is formed into a ring by bending at least a portion of the strip portion, overlapping a portion of an area from the distal portion to the intermediate portion on the surface of the proximal portion in one thickness direction, and engaging one of the teeth to the engaging means, wherein the ring has a diameter that is configured to be adjusted by selecting one of the teeth engaged to the engaging means,
 wherein the teeth are formed on opposite sides of the strip portion in a width direction,
 a plurality of the engaging means are formed spaced apart from each other in the width direction of the proximal portion so as to respectively engage the teeth on opposite sides of the strip portion in the width direction, and
 a release portion is provided between the engaging means for allowing the portion of the distal portion and the intermediate portion where the teeth are formed to be moved into and out of a space between the engaging means,
 wherein the proximal portion of the strip portion includes a weakened portion provided between the engaging means,
 wherein said release portion is configured to allow a part of the band in which the teeth are formed to move in the thickness direction of the band, whereby the part of the band is moved into and out from the engaging means, and
 wherein the weakened portion is configured to widen the interval between the engaging means.

2. The band of claim 1, wherein the engaging means includes a stopper portion for preventing the tooth from being unhooked in the thickness direction.

3. The band of claim 2, wherein the stopper portion is spaced apart from the surface of the proximal portion in one thickness direction in the thickness direction.

4. The band of claim 2, wherein the stopper portion includes a guide surface formed thereon for guiding the strip portion into the space between the engaging means.

5. The band of claim 1, wherein the proximal portion of the strip portion is formed wider than the intermediate portion and the distal portion.

6. The band of claim 1, wherein a thick portion, which is thicker than a central portion of the proximal portion in the width direction, is formed on each side of the proximal portion in the width direction, and the engaging means is integral with the thick portions.

7. The band of claim 1, wherein the engaging means include protruding portions protruding from the surface of the proximal portion in one thickness direction and facing each other in the width direction of the proximal portion.

8. The band of claim 1, wherein the weakened portion is a hole running through the proximal portion of the strip portion in the thickness direction.

9. A bag set including, as a set, the band of claim 1 and a bag.

* * * * *